May 14, 1968  JUNNOSUKE TSUJI  3,382,997

CROWN CAP

Filed May 11, 1965  11 Sheets-Sheet 1

INVENTOR.
J. TSUJI
BY Moonray Kojima
ATTORNEY

May 14, 1968  JUNNOSUKE TSUJI  3,382,997
CROWN CAP
Filed May 11, 1965  11 Sheets-Sheet 2
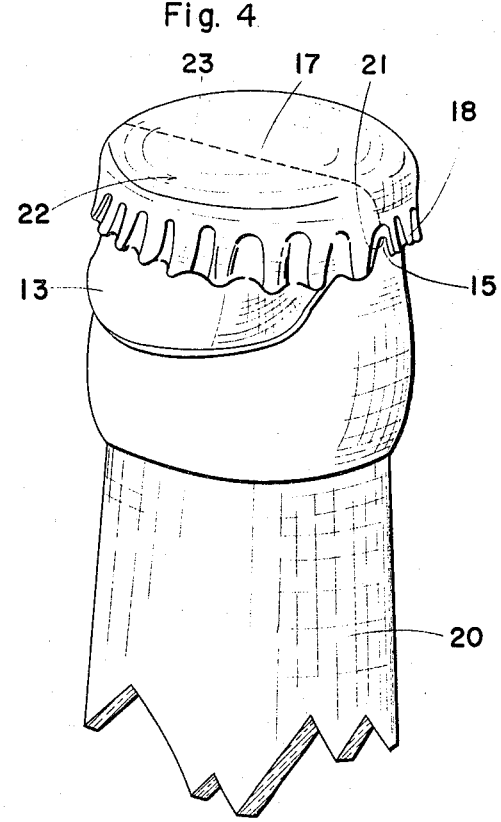
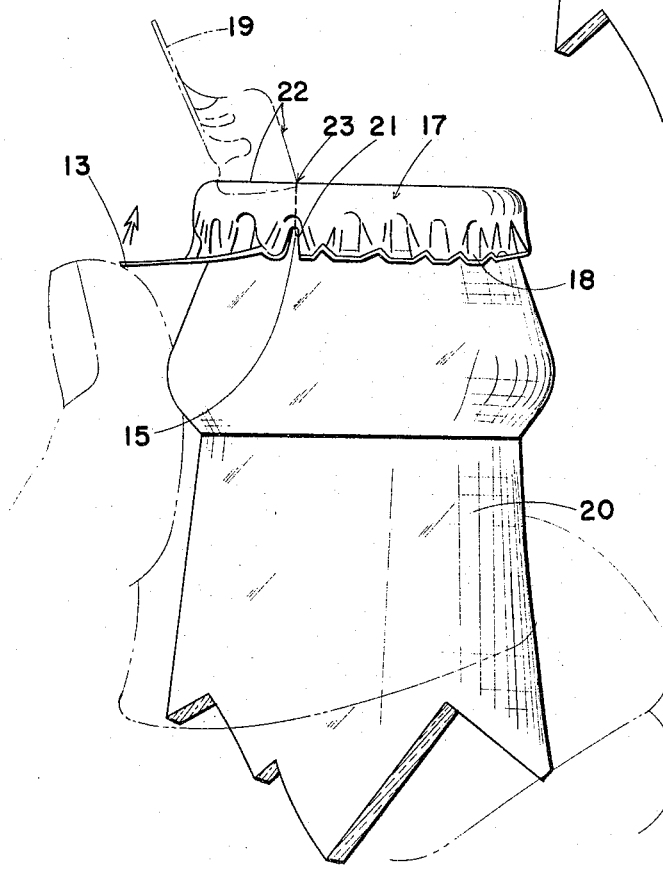
INVENTOR.
J. TSUJI
ATT'NY

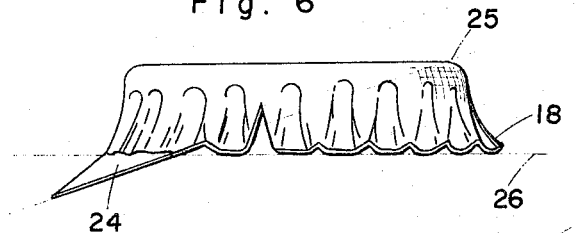
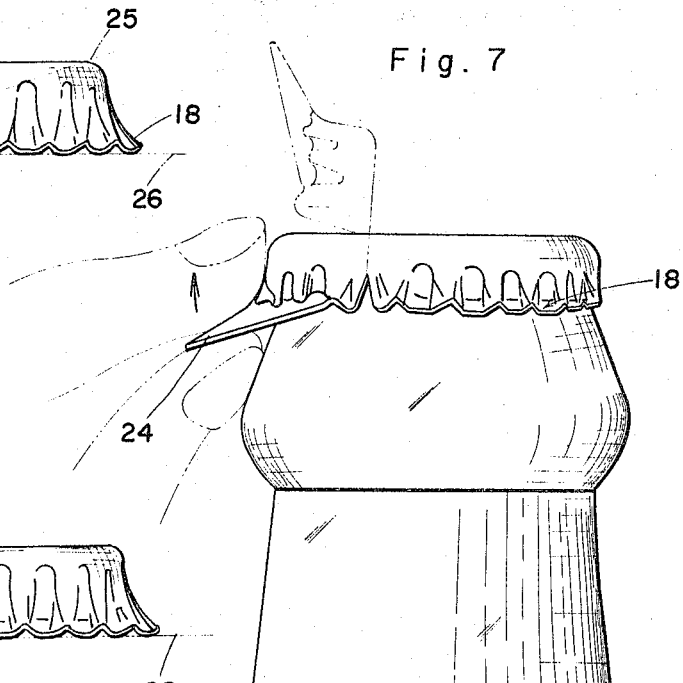
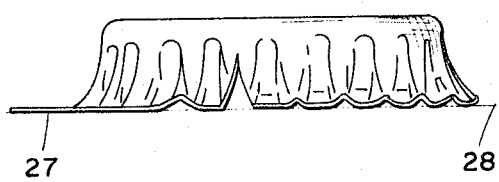
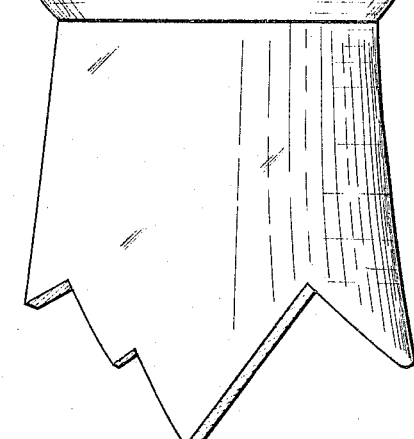
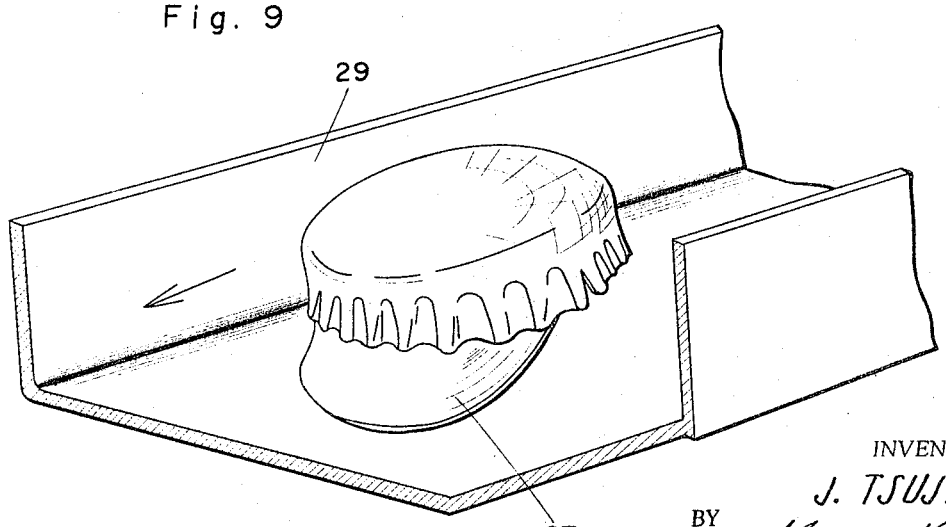

May 14, 1968   JUNNOSUKE TSUJI   3,382,997
CROWN CAP

Filed May 11, 1965   11 Sheets-Sheet 4

INVENTOR.
J. TSUJI
BY
ATT'NY

Fig. 12
Fig. 13
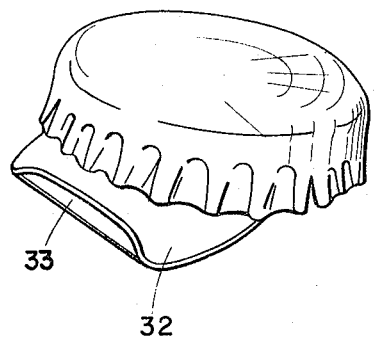
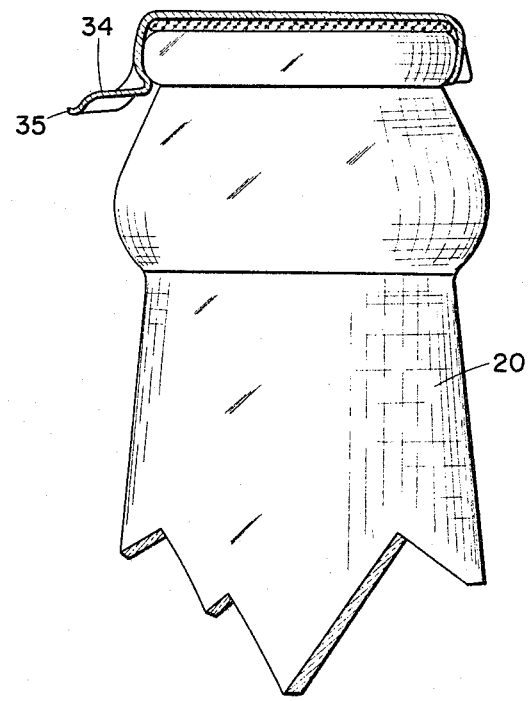
Fig. 14
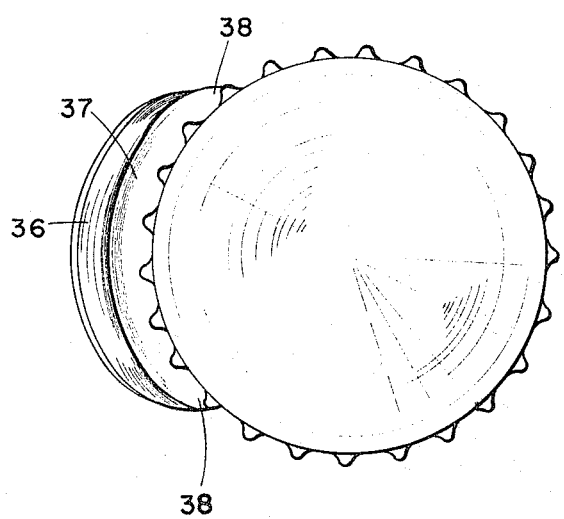
INVENTOR.
J. TSUJI
BY
ATT'NY Fig. 16
Fig. 15
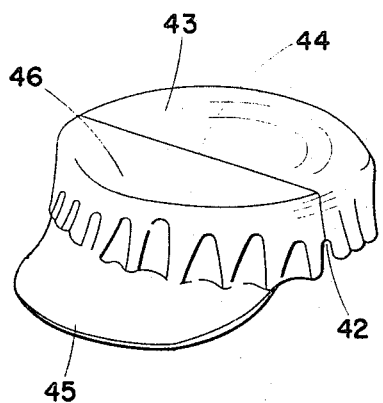
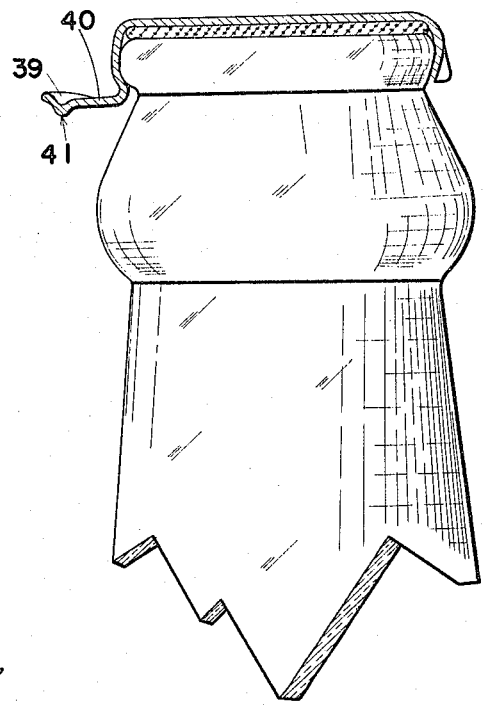
Fig. 17
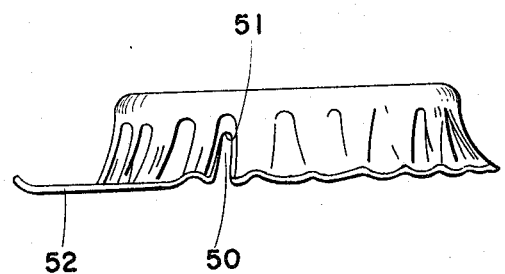
INVENTOR.
J. TSUJI
BY
ATT'NY May 14, 1968   JUNNOSUKE TSUJI   3,382,997
CROWN CAP Filed May 11, 1965   11 Sheets-Sheet 7

INVENTOR.
J. TSUJI
BY
ATT'NY

May 14, 1968  JUNNOSUKE TSUJI  3,382,997
CROWN CAP

Filed May 11, 1965  11 Sheets-Sheet 8

INVENTOR.
J. TSUJI
BY
ATT'NY

May 14, 1968  JUNNOSUKE TSUJI  3,382,997
CROWN CAP

Filed May 11, 1965  11 Sheets-Sheet 9

INVENTOR.
J. TSUJI
BY
ATT'NY

INVENTOR.
J. TSUJI
BY
ATT'NY

United States Patent Office 3,382,997
Patented May 14, 1968

3,382,997
CROWN CAP
Junnosuke Tsuji, 28 Kagetori-cho 38,
Totsuka-ku, Yokohama, Japan
Filed May 11, 1965, Ser. No. 454,802
Claims priority, application Japan, Dec. 29, 1964,
40/271, 40/273
1 Claim. (Cl. 215—46)

The present invention relates to a crown cap used as a closure for a container such as a bottle, and more particularly to a crown cap having a tongue extending from the fluted portion of the cap for allowing easy removal thereof from the container without the need of using any separate opener tool.

A first object of the invention is to provide a crown cap so adapted that when it is desired to remove the cap from the container by upwardly urging said tongue with the finger, a crack is positively produced in a predetermined region of the crown cap, thereby allowing easy removal thereof by a relatively small operative force.

A second object of the invention is to provide a crown cap of the referred to above adapted to allow easy and desired capping operation thereof.

A third object of the invention is to provide a crown cap so adapted that when the cap is to be manipulated for removal, it gives a minimum of pain to the finger.

These and other objects and advantages of the invention will be fully understood by referring to the following description of preferred embodiments thereof shown in the accompanying drawings, in which:

FIG. 4 is a perspective view of said principal portion;

FIG. 5 is a side view of said principal portion, illustrating the operation of removal of the cap;

FIG. 6 is a side view of a second embodiment;

FIG. 7 is a side view showing the principal portion in operated position;

FIG. 8 is a side view of a third embodiment;

FIG. 9 is a perspective view showing the principal portion, with some parts cut away;

Figure 10:
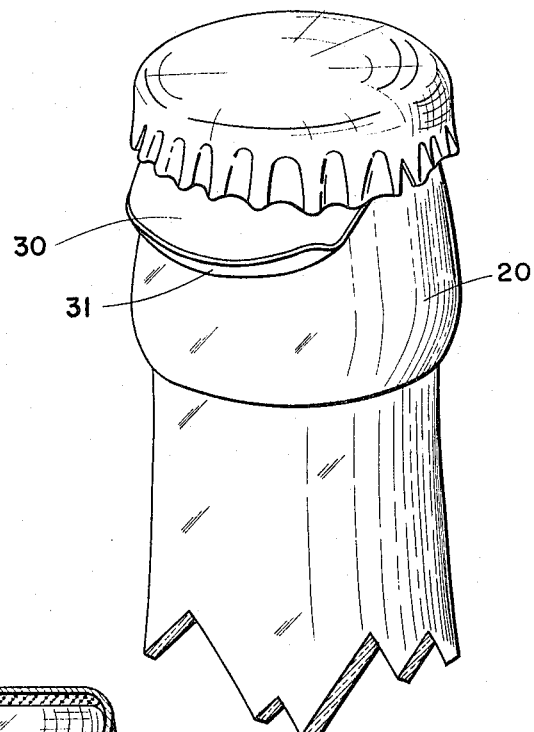
Figure 11:
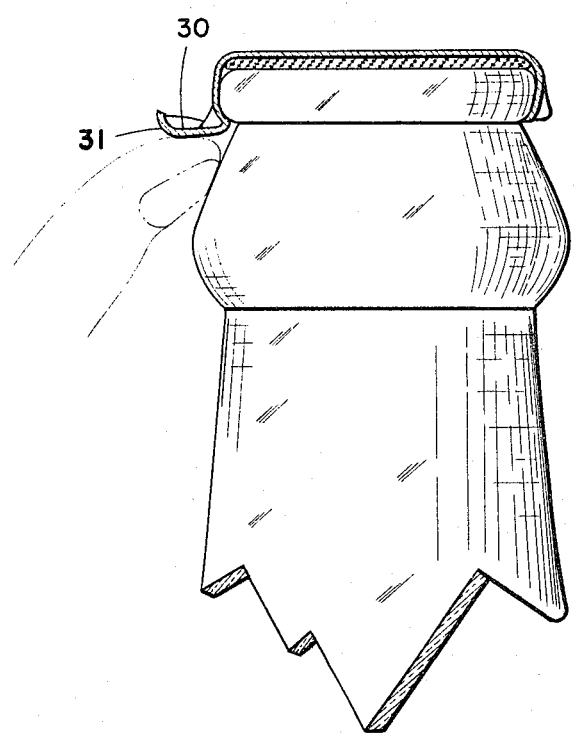
Figure 18:
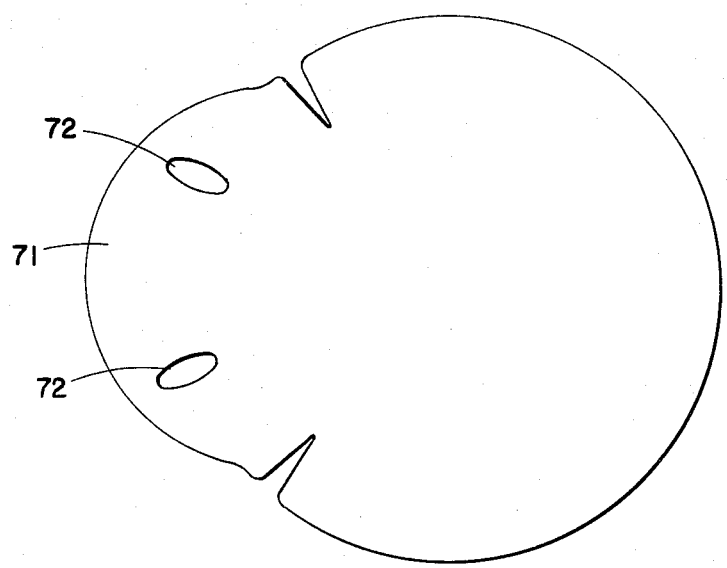
Figure 19:
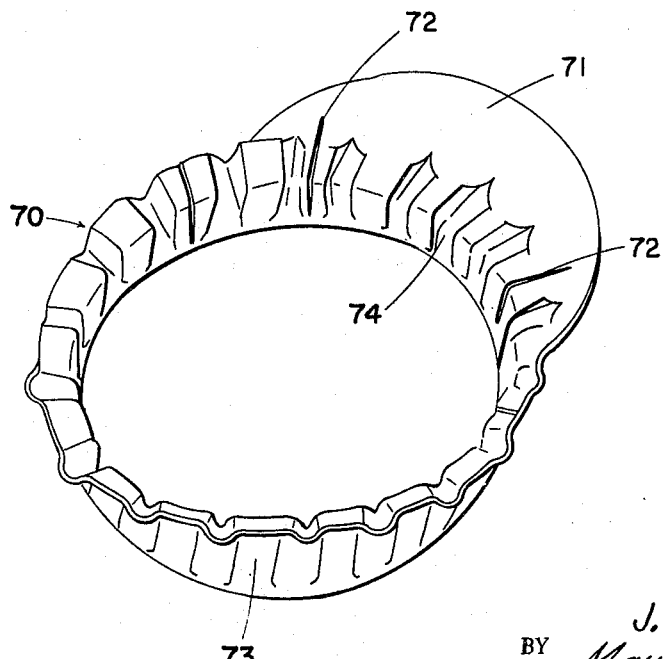
Figure 20:
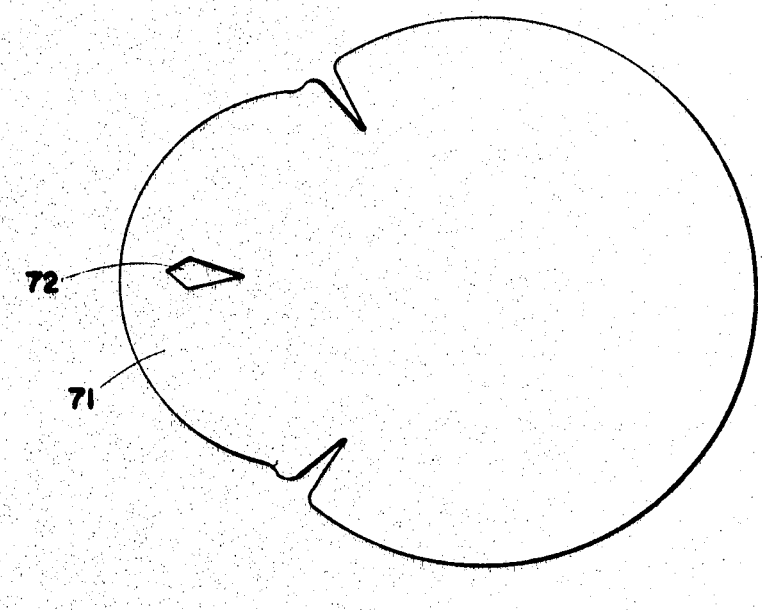
Figure 21:
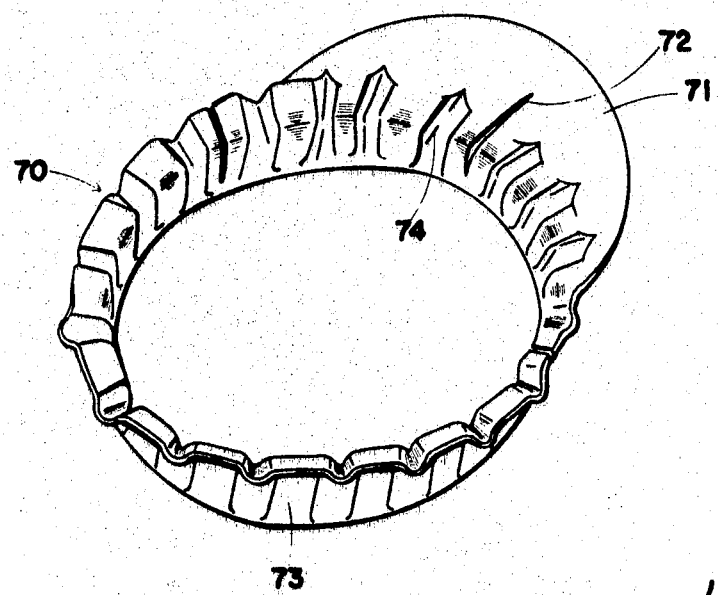
Figure 22:
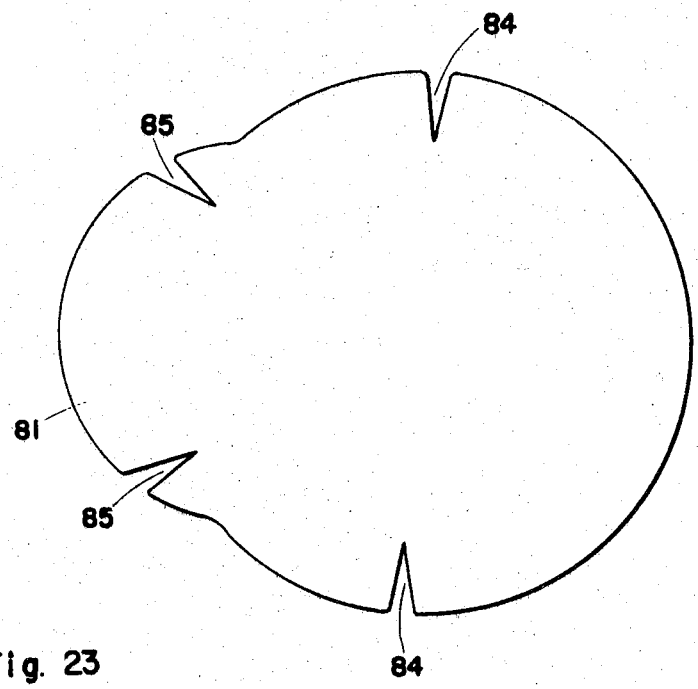
Figure 23:
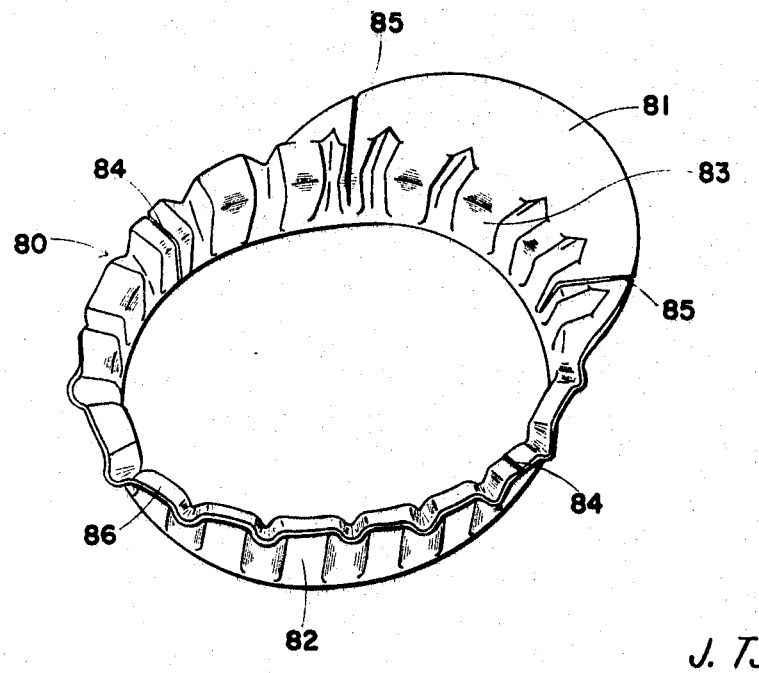
Figure 24:
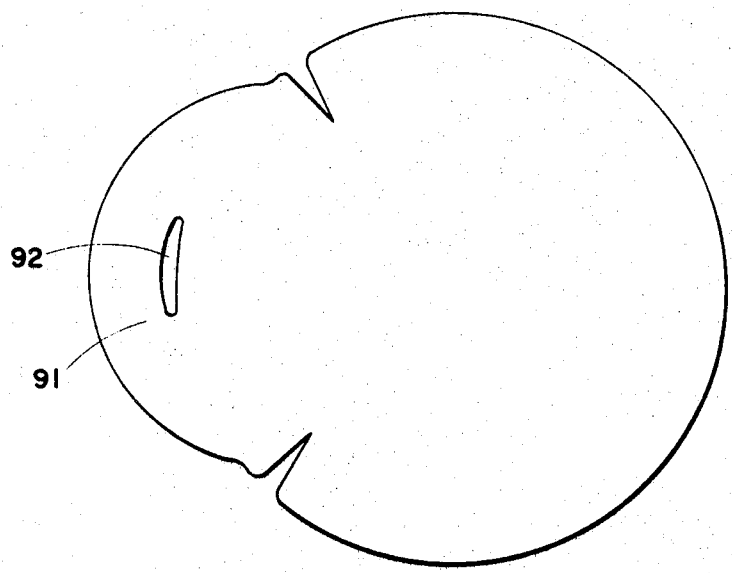
Figure 25:
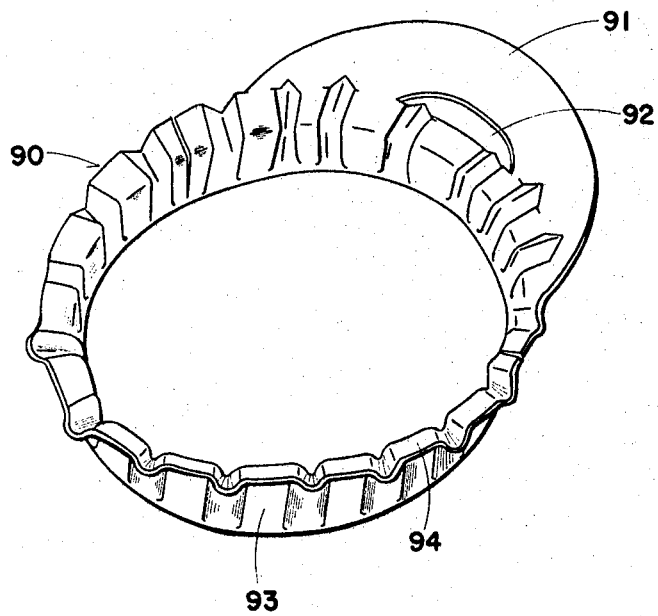
Figure 26:
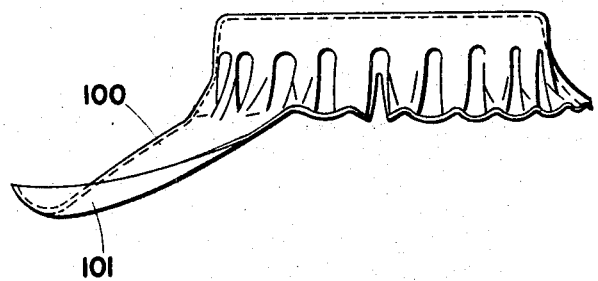

FIGS. 10 through 13 show a fourth embodiment, of which FIGS. 10 and 12 are perspective views, and FIGS. 11 and 13 are side views showing the principal portion in operative position, with some parts cut away;

FIG. 14 is a plan view of a fifth embodiment;

FIG. 15 is a side view of a sixth embodiment;

FIG. 16 is a perspective view of a seventh embodiment;

FIGURE 17 is a side view of an eighth embodiment;

FIGURES 18 through 21 show a ninth embodiment, of which FIGURES 18 and 20 are plan views of sheet metals prior to the formation thereof, and FIGURES 19 and 21 are bottom perspective views after the completion of formation;

FIGURE 22 is a plan view of a sheet metal in tenth embodiment prior to the formation of the sheet metal into a crown cap;

FIGURE 23 is a bottom perspective view of a crown cap formed of the sheet metal shown in FIGURE 22;

FIGURE 24 is a plan view of a sheet metal in an eleventh embodiment prior to the formation of the sheet metal into a crown cap;

FIGURE 25 is a bottom perspective view of a crown cap formed of the sheet metal shown in FIGURE 24;

FIGURE 26 is a side view of a twelfth embodiment; and

Figure 27:
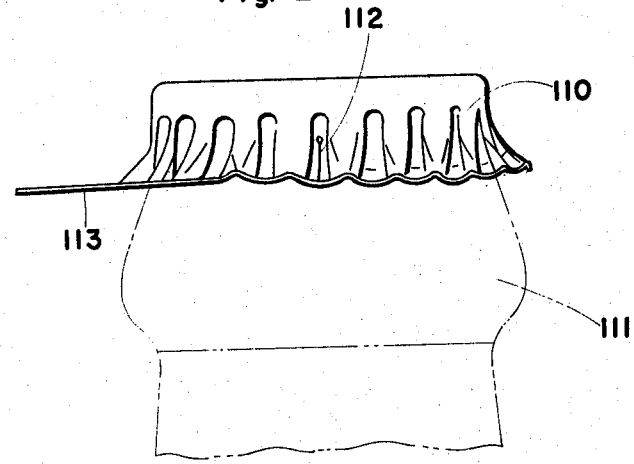

FIGURE 27 is a side view showing the principal portion in operated position.

A first embodiment of the invention will now be described with reference to FIGURES 1 through 5.

Figure 1:
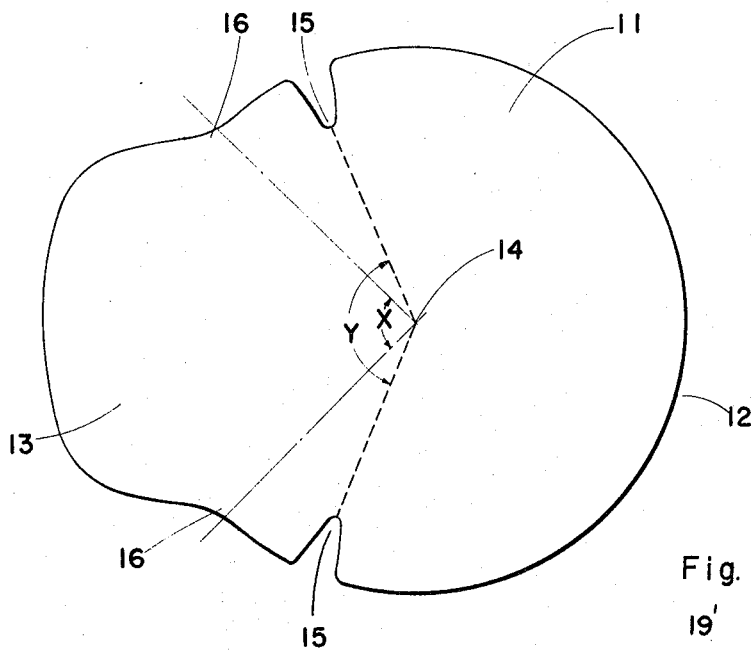
FIG. 1 is a plan view showing a sheet metal prior to the formation thereof into a crown cap.

As shown in FIGURE 1, a partially circular sheet metal 11 has a tongue 13 integrally extending from a part of a peripheral edge 12, and a pair of notches 15 extending inwardly from the peripheral edge towards the center 14 of the sheet. The peripheral extension of said tongue is such that its opposed ends 16 form a central angle X of about 90 degrees. The notches 15 are symmetrically located with respect to said tongue and have a central angle Y of about 130 degrees.

Figure 2:
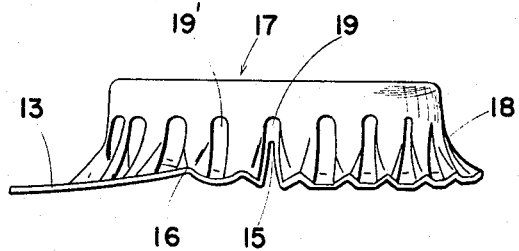
FIG. 2 is a side view of a crown cap formed of said sheet metal.

FIGURE 2 shows a crown cap 17 formed by pressing said sheet metal 11 in such a manner that said notches 15 may be positioned in valleys or flutes 19 of a fluted portion 18 and that there may exist one flute 19' between the flute 19 in which said notch is positioned and one of the ends 16 of said tongue 13. It is important that the notch 15 be positioned in the flute 19 adjacent the flute 19' which is adjacent the end 15, since in the region of the flute 19' the flow of material occurring in forming operation is prevented from moving towards the tongue but is allowed of its movement only in a direction away from the tongue owing to the presence of the tongue. If the notch were positioned in the flute 19', such flow of material in the region of the flute 19' would cause the side edges of the notch to be mutually overlapped, whereby the ability of the crown cap to sustain the internal pressure of the container would be decreased. Thus, since the flute 19 adjacent to the flute 19' is substantially prevented from receiving the effect of the lateral flow of material, the notch 15 which is positioned in this flute 19 maintains its desired shape. It seems that the prevention of said effect on the flute 19 is responsible for the existence of intervening hill or raised portion which would accommodate the substantial flow of material. The fluted portion 18 is so formed that it assumes a substantially uniform shape throughout its periphery. On the contrary, in the case that those flutes ending in the tongue 13 are made larger than the other flutes, the capping operation will become inconvenient since the orientation of crown caps to be applied to bottles must be limited to a particular direction in view of the particular shape of the corresponding capping tool, whereby the efficiency of capping operation is decreased. A further disadvantage thereof is that the sustainable pressure of crown caps is decreased. It is apparent that the crown cap according to the invention as described above is free of these disadvantages.

Figure 3:
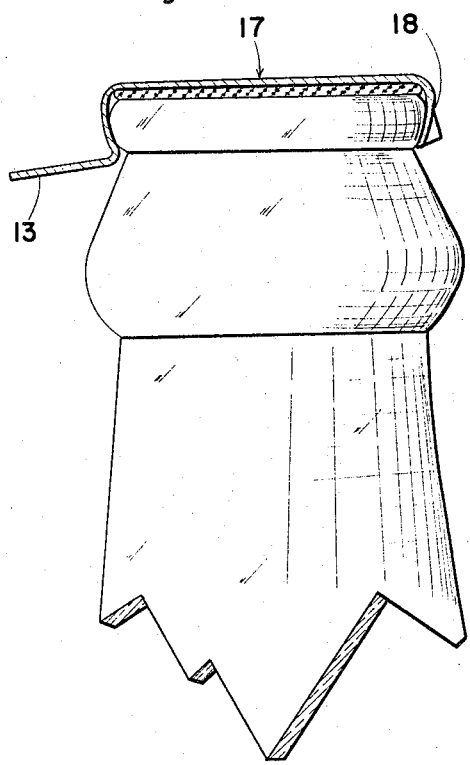
FIG. 3 is a side view, in longitudinal section, of the principal portion of said cap fitted on the mouth portion of a bottle, said cap shown in longitudinal section.

The crown cap 18 is fitted on the mouth of a bottle 20, as shown in FIGURES 3 through 5. When it is desired to remove the thus fitted crown cap 18 therefrom, it is possible to use a conventional opener tool, but there will now be described a mode of removing operation effected by using the fingers. As shown in FIGURE 5, the neck of the bottle is grasped with the fingers, with the thumb urging the underside of the tongue 13. When an upward push is applied to the tongue 13 with said thumb, cracks are started upwardly from the tops 21 of the two notches 15 which are the weakest points in the cap. When these two cracks reach the top surface of the crown cap, a region 22 nearer to the tongue 13 from a bending line 23 joining both cracks is upwardly bent around said line 23 out of engagement with the mouth of the bottle 20. As a result, the whole crown cap can now be easily removed from the mouth of the bottle 20. In this connection, it should be noted that if the aforesaid central angle Y is too small, the tongue along tends to be bent around its root, and even if said region 22 is successfully bent upwardly, the removal of the whole crown cap becomes difficult. On the other hand, if the central angle Y is too large, a considerably high operative force is required for cap removal and, moreover, it is hardly possible to achieve smooth removing operation of the cap. The present invention has solved these problems.

A second embodiment of the invention will now be described with reference to FIGURES 6 and 7. In this embodiment, a tongue 24 downwardly projects to lie in an imaginary plane 25 inclined with respect to an imaginary plane 26 including the lower edge of the fluted portion 18. As a result, the tongue 24 is curved to project upwardly along the periphery of the crown cap, so that the strength of the root of the tongue resisting an operative force applied thereto in cap removing operation is greatly increased, thereby preventing the bending of the tongue alone, thus insuring the transmission of said operative force to the fluted portion.

In a third embodiment shown in FIGURE 8, a tongue 27 horizontally projects to lie in an imaginary plane 28 including the lower edge of the fluted portion. In this case, the stability in slipping the crown cap on a crown cap transfer chute 29 in a capping apparatus is insured.

A fourth embodiment is shown in FIGURES 10 through 13. As shown in FIGURES 10 and 11, a tongue 30 has its peripheral portion 31 turned upwardly. In FIGURE 12, a tongue 32 has its front portion 33 bent around a straight line. In FIGURE 13, a tongue 34 has its peripheral portion 35 turned downwardly. These are all intended to reinforce the peripheral portion of a tongue. Particularly as shown in FIGURES 10 through 12, if the peripheral tongue portion is turned upwardly, a pain in the finger caused in cap removing operation will be reduced.

In a fifth embodiment, as shown in FIGURE 14, the operation of downwardly bending the peripheral portion 36 of a tongue 37 is effected in such a manner as to leave both ends 38, thereby achieving the advantages of the fourth embodiment in such a condition that in capping operation the engaging or working depth of a capping tool may not be shallow, even locally, thereby to insure sufficient engagement of the fitted crown cap with the bottle to exclude the possibility of decreasing the sustainable pressure thereof. It is understood that if the upper turned peripheral portion 36 of the tongue is connected to the fluted portion of the crown cap, the working depth of a capping tool will be decreased by an amount corresponding to the height of the turned region and thus the sustainable pressure is decreased at least in this portion.

A sixth embodiment is shown in FIGURE 15. A tongue 40 has a rib 41 extending peripherally of its peripheral portion 39. The rib 41 reinforces the tongue 40. Such rib may project downwardly or upwardly and may be provided in plurality.

A seventh embodiment is designed to attain easier cap removal. This is shown in FIGURE 16 wherein there is provided a thin-walled portion 44 extending transversely of the top surface 43 of a crown cap and connected at least to one of notches 42, thereby assuring the easiness with which the front side portion 46 together with a tongue 45 connected thereto is upwardly bent in cap removing operation.

An eighth embodiment will now be described with reference to FIGURE 17. As shown, it is constructed by forming the tops 51 of notches 51 to assume an arc shape. In other words, the notch 51 is formed to assume an inverted U-shape. Such arc shape not only facilitates the manufacture of crown caps, but also prevents too easy creation of cracks when accidental upward thrust is applied to the tongue 52 of the crown cap in fitted position.

An ninth embodiment is shown in FIGURES 18 through 21. The purpose of this embodiment is to eliminate the disadvantage that those flutes or flares of the fluted portions 74 of a crown cap 70 which form an extension of a tongue 71 is prevented from assuming a desired shape in pressing operation because of the presence of the tongue. That is, a fluted region 73 not having the tongue 71 projecting therefrom will allow its material to flow peripherally thereof in pressing operation, whereas the material in said fluted portion 74 is prevented from peripherally flowing. With this point borne in mind, this embodiment is provided with substantially radially extending openings 72 formed in the boundary region between the fluted portion 74 and tongue 71. Such openings 72 serve to accommodate the flow or elongation of material in said region. No limitation is imposed on the number of such openings. However, if two openings are provided adjacent either side of the tongue, as shown in FIGURES 18 and 19, it will be insured that the transmission of an operative force from the tongue to the whole crown cap is started from the central portion of tongue. As shown in FIGURES 20 and 21, a single opening 72 may be provided in the central portion of the tongue.

FIGURES 22 and 23 show a tenth embodiment wherein instead of providing openings shown in FIGURES 18 and 19 there are provided notches 85 thereby further facilitating the desired shaping of the fluted portion. In these figures, the reference numeral 80 denotes a crown cap, 81 a tongue, 82 a fluted portion, 83 that part of the fluated portion 82 from which the tongue extends, and 84, notches. The aforesaid notches 85 are provided so as to extend from the areas adjacent the opposed ends of the tongue 81 to said fluted part 83.

An eleventh embodiment is shown in FIGURES 24 and 25 wherein in order that a tongue 91 extending from the lower edge of the fluted portion 93 of a crown cap 90 may be formed in a bridge shape, the central portion of the root of the tongue 91 is provided with a peripherally extending elongated opening 92 which serves to accommodate the flow of material in the extension of the tongue at the time of formation of the flutes of the fluted portion, thereby further facilitating the desired formation of the entire fluted portion.

A twelfth embodiment will be described with reference to FIGURE 26. This embodiment is designed to eliminate the disadvantage of the crown cap according to the second embodiment (see FIGURES 6 and 7), i.e., the disadvantage that although the increase in strength is attained a pain caused in the finger in manipulation of the crown cap is also increased. To this end, the peripheral portion 101 of a tongue 100 corresponding to that shown in the second embodiment is upwardly bent. Such upward bending also results in the fact that the tongue 100 possesses a "double curvature."

A thirteenth embodiment shown in FIGURE 27 is similar to the eighth embodiment except that in this case, notches such as those shown in the eighth embodiment are closed. The reference numeral 110 denotes a crown cap in fitted position having closed notches 112 and the tongue 113. Such closing of notches not only prevents the sustainable pressure from being decreased due to the presence of the notches, but also excludes the possibility of dust collecting in the notches, thereby providing improved sanitation. Further, it facilitates the formation of the crown cap and is highly practicable.

The present invention has been described with reference to a number of embodiments thereof. It is understood that any of these embodiments achieves objects of the invention by providing notches in addition to a tongue in the manner as described thereby facilitating removal of crown caps with the finger.

It is also understood that the present disclosure of the preferred forms of the invention has been made only by way of example and that numerous changes in details of construction and the combination of two or more of these forms may be resorted to without departing from the spirit and scope of the invention as hereinafter claimed.

I claim:
1. A crown cap for sealing bottles comprising
   a structure having a circular substantially planar surface and a depending corrugated flange including ridges and grooves,
   a single substantially short tongue integrally connected to the edge of said flange and extending therefrom substantially parallel to said surface, the part of said single tongue connecting said corrugated flange sweeping an arc of from 100° to 120° as measured from the center of said circular surface,
   a pair of notches, each defined in the second groove from the ends of said part of said flange connected to said tongue, and
   an opening positioned in said tongue and extending into said corrugated flange, whereby
   pressure applied perpendicular to said tongue in a direction toward the said surface causes said notches to split in said direction and to enable the flange portion connected to said tongue to be rotated about a line connecting the split notches at said surface away from the remaining flange portion thereby to release the seal from said bottle.

References Cited

UNITED STATES PATENTS

| | | | |
|---|---|---|---|
| 1,063,384 | 6/1913 | Prell | 215—46 |
| 1,239,238 | 9/1917 | White | 215—46 |
| 1,706,720 | 3/1929 | Wettstein | 215—46 |
| 2,433,629 | 12/1947 | Shannon | 215—46 |
| 3,187,919 | 6/1965 | Inglis | 215—46 |
| 3,200,982 | 8/1965 | Cormier | 215—46 |

FOREIGN PATENTS

| | | |
|---|---|---|
| 243,871 | 12/1925 | Great Britian. |
| 406,534 | 3/1934 | Great Britain. |
| 515,093 | 2/1955 | Italy. |
| 564,462 | 6/1957 | Italy. |
| 567,277 | 10/1957 | Italy. |

JOSEPH R. LECLAIR, *Primary Examiner.*

R. PESHOCK, *Assistant Examiner.*